United States Patent
Rauser et al.

(10) Patent No.: US 7,461,058 B1
(45) Date of Patent: Dec. 2, 2008

(54) OPTIMIZED RULE BASED CONSTRAINTS FOR COLLABORATIVE FILTERING SYSTEMS

(75) Inventors: John Rauser, Minneapolis, MN (US); Valerie Guralnik, Eden Prairie, MN (US)

(73) Assignee: Thalveg Data Flow LLC, Los Altos, CA (US)

( * ) Notice: Subject to any disclaimer, the term of this patent is extended or adjusted under 35 U.S.C. 154(b) by 0 days.

(21) Appl. No.: 09/404,597

(22) Filed: Sep. 24, 1999

(51) Int. Cl.
*G06F 17/30* (2006.01)
*G06F 7/00* (2006.01)

(52) U.S. Cl. ............................. 707/5; 707/2
(58) Field of Classification Search ............ 705/27, 705/10; 707/1–10; 706/45–61
See application file for complete search history.

(56) References Cited

U.S. PATENT DOCUMENTS

| | | | | |
|---|---|---|---|---|
| 4,870,579 A * | 9/1989 | Hey | .............................. | 705/27 |
| 4,996,642 A * | 2/1991 | Hey | .............................. | 705/27 |
| 5,091,852 A * | 2/1992 | Tsuchida et al. | ............... | 707/2 |
| 5,668,987 A * | 9/1997 | Schneider | ...................... | 707/3 |
| 5,749,081 A * | 5/1998 | Whiteis | ...................... | 707/102 |
| 5,790,426 A * | 8/1998 | Robinson | .................... | 702/179 |
| 5,835,087 A | 11/1998 | Herz et al. | .................. | 715/810 |
| 5,872,850 A * | 2/1999 | Klein et al. | ................... | 705/51 |
| 5,884,282 A * | 3/1999 | Robinson | ...................... | 705/27 |
| 5,893,909 A | 4/1999 | Nomura et al. | ................ | 707/5 |
| 5,918,014 A * | 6/1999 | Robinson | .................... | 709/219 |
| 5,983,214 A | 11/1999 | Lang et al. | ...................... | 707/1 |
| 6,006,218 A * | 12/1999 | Breese et al. | ................... | 707/3 |
| 6,006,225 A | 12/1999 | Bowman et al. | ............... | 707/5 |
| 6,016,475 A | 1/2000 | Miller et al. | .................... | 705/1 |
| 6,018,738 A | 1/2000 | Breese et al. | ............... | 707/100 |
| 6,041,311 A * | 3/2000 | Chislenko et al. | ............. | 705/27 |
| 6,049,777 A | 4/2000 | Sheena et al. | ...................... | 705/10 |
| 6,064,980 A * | 5/2000 | Jacobi et al. | .................. | 705/26 |
| 6,067,542 A * | 5/2000 | Carino, Jr. | ..................... | 707/4 |
| 6,092,049 A | 7/2000 | Chislenko et al. | ............. | 705/10 |
| 6,108,493 A | 8/2000 | Miller et al. | ................. | 709/219 |
| 6,112,186 A | 8/2000 | Bergh et al. | .................... | 705/10 |
| 6,266,649 B1 * | 7/2001 | Linden et al. | ................. | 705/26 |
| 6,313,745 B1 * | 11/2001 | Suzuki | ...................... | 340/572.1 |
| 6,314,420 B1 * | 11/2001 | Lang et al. | ...................... | 707/3 |
| 6,317,722 B1 * | 11/2001 | Jacobi et al. | .................. | 705/14 |

(Continued)

FOREIGN PATENT DOCUMENTS

CA   2249096 A1 *   3/2000

(Continued)

OTHER PUBLICATIONS

PRNewswire, "Net Perceptions and Shop At Home to Provide Personalized Product Recommendations for Shop At Home Customers", Jul. 19, 1999.*

(Continued)

*Primary Examiner*—Luke S Wassum
(74) *Attorney, Agent, or Firm*—Sterne, Kessler, Goldstein & Fox, P.L.L.C.

(57) ABSTRACT

Methods, systems, and articles of manufacture consistent with the present invention provide a recommendation server that receives a recommendation request from a user of a client computer. The recommendation server contains software to provide recommendations to the user. To provide the recommendations, the recommendation server applies a constraint filter and a recommendation filter on a set of items.

39 Claims, 9 Drawing Sheets

U.S. PATENT DOCUMENTS

| | | | |
|---|---|---|---|
| 6,321,179 B1* | 11/2001 | Glance et al. | 702/189 |
| 6,321,221 B1* | 11/2001 | Bieganski | 707/5 |
| 6,334,127 B1* | 12/2001 | Bieganski et al. | 707/5 |
| 6,341,281 B1* | 1/2002 | MacNicol et al. | 707/3 |
| 6,356,889 B1* | 3/2002 | Lohman et al. | 707/2 |
| 6,412,012 B1* | 6/2002 | Bieganski et al. | 709/232 |
| 6,415,368 B1* | 7/2002 | Glance et al. | 711/158 |
| 6,434,550 B1 | 8/2002 | Warner et al. | 707/3 |
| 6,438,579 B1* | 8/2002 | Hosken | 709/203 |
| 6,460,036 B1* | 10/2002 | Herz | 707/10 |
| 6,487,539 B1* | 11/2002 | Aggarwal et al. | 705/14 |
| 6,629,079 B1* | 9/2003 | Spiegel et al. | 705/26 |
| 6,636,836 B1 | 10/2003 | Pyo | 705/26 |
| 2002/0065721 A1 | 5/2002 | Lema et al. | 705/14 |
| 2002/0120609 A1* | 8/2002 | Lang et al. | 707/1 |
| 2002/0199194 A1 | 12/2002 | Ali | 725/46 |
| 2003/0191737 A1 | 10/2003 | Steele et al. | 707/1 |
| 2004/0034652 A1 | 2/2004 | Hofmann et al. | 707/102 |
| 2005/0091245 A1 | 4/2005 | Chickering et al. | 707/100 |
| 2005/0125307 A1 | 6/2005 | Hunt et al. | 705/26 |
| 2007/0124276 A1* | 5/2007 | Weissman et al. | 707/2 |

FOREIGN PATENT DOCUMENTS

| | | |
|---|---|---|
| JP | 1-169605 | 7/1989 |
| JP | 7-152771 | 6/1995 |
| JP | 7-234881 | 9/1995 |
| JP | 8-331077 | 12/1996 |
| JP | 9-153027 | 6/1997 |
| JP | 9-265478 | 10/1997 |
| JP | 10-32797 | 2/1998 |
| JP | 10-63680 | 3/1998 |
| JP | 10-63681 | 3/1998 |
| JP | 10-63749 | 3/1998 |
| JP | 10-74206 | 3/1998 |
| JP | 10-91642 | 4/1998 |
| JP | 10-91647 | 4/1998 |
| JP | 10-91686 | 4/1998 |
| JP | 10-143540 | 5/1998 |
| JP | 10-143541 | 5/1998 |
| JP | 10-162025 | 6/1998 |
| JP | 10-162027 | 6/1998 |
| JP | 10-162028 | 6/1998 |
| JP | 10-198706 | 7/1998 |
| JP | 10-228482 | 8/1998 |
| JP | 10-228487 | 8/1998 |
| JP | 10-240749 | 9/1998 |
| JP | 10-247198 | 9/1998 |
| JP | 10-257405 | 9/1998 |
| JP | 10-260955 | 9/1998 |
| JP | 10-283403 | 10/1998 |
| JP | 10-289245 | 10/1998 |
| JP | 10-301950 | 11/1998 |
| JP | 10-307845 | 11/1998 |
| JP | 10-320415 | 12/1998 |
| JP | 10-340270 | 12/1998 |
| JP | 11-7453 | 1/1999 |
| JP | 11-7472 | 1/1999 |
| JP | 11-15840 | 1/1999 |
| JP | 11-45265 | 2/1999 |
| JP | 11-45284 | 2/1999 |
| JP | 11-45286 | 2/1999 |
| JP | 11-45289 | 2/1999 |
| JP | 11-45290 | 2/1999 |
| JP | 11-53394 | 2/1999 |
| JP | 11-66081 | 3/1999 |
| JP | 11-66097 | 3/1999 |
| JP | 11-66098 | 3/1999 |
| JP | 11-96164 | 4/1999 |
| JP | 11-110410 | 4/1999 |
| JP | 11-120189 | 4/1999 |
| JP | 11-134345 | 5/1999 |
| JP | 11-134361 | 5/1999 |
| JP | 11-143900 | 5/1999 |
| JP | 11-161670 | 6/1999 |
| JP | 11-164217 | 6/1999 |
| JP | 11-175546 | 7/1999 |
| JP | 11-184890 | 7/1999 |
| JP | 11-184891 | 7/1999 |
| JP | 11-195035 | 7/1999 |
| JP | 11-205706 | 7/1999 |
| JP | 11-212996 | 8/1999 |
| JP | 11-232278 | 8/1999 |
| JP | 11-232287 | 8/1999 |
| JP | 11-509019 | 8/1999 |
| JP | 11-250091 | 9/1999 |
| JP | 11-259497 | 9/1999 |
| JP | 11-272574 | 10/1999 |
| JP | 11-282874 | 10/1999 |
| JP | 11-282875 | 10/1999 |
| JP | 11-308547 | 11/1999 |
| JP | 11-312177 | 11/1999 |
| JP | 11-316759 | 11/1999 |
| JP | 11-328266 | 11/1999 |
| JP | 11-338869 | 12/1999 |
| JP | 11-338872 | 12/1999 |
| JP | 11-338879 | 12/1999 |
| JP | 11-345446 | 12/1999 |
| JP | 2000-13708 | 1/2000 |
| JP | 2000-23112 | 1/2000 |
| JP | 2000-48046 | 2/2000 |
| JP | 2000-57090 | 2/2000 |
| WO | WO 98/33135 A1 | 7/1998 |
| WO | WO 98/40832 A2 | 9/1998 |
| WO | WO 01/24032 A2 | 4/2001 |
| WO | WO 01/37162 A2 | 5/2001 |

OTHER PUBLICATIONS

Jarke, M. and Koch, J. "Query Optimization in Database Systems", ACM Computing Surveys, vol. 16, No. 2, Jun. 1984, pp. 111-152.*

Jarke, M. and J. Koch "Query Optimization in Database Systems", ACM Computing Surveys, vol. 16, No. 2, pp. 111-152, Jun. 1984.*

Schafer, J.B., J. Konstan and J. Riedl "Recommender Systems in E-Commerce", Proceedings of the 1st ACM Conference on Electronic Commerce, pp. 158-166, Nov. 1999.*

Schafer, J.B., J.A. Konstan and J. Riedl "Meta-Recommendation Systems: User-Controlled Integration of Diverse Recommendations", Proceedings of the 11th International Conference on Information & Knowledge Management, pp. 43-51, Nov. 4-9, 2002.*

Stolze, M. "Domain-Oriented Recommender Applications: A Framework for Intimate Recommending", Proceedings of the Adaptive Hypermedia Workshop on Recommendation and Personalization in eCommerce, pp. 124-131, 2002.*

"Agents that Reduce Work and Information Overload," *Communications of the ACM*, Jul. 1994, vol. 37, No. 7, pp. 31-40 and 46.

Balabonovic, M. et al., "Content-Based, Collaborative Recommendation," *Communications of the ACM*, Mar. 1997, vol. 40, No. 3, pp. 66-72.

Basu, C. et al., "Recommendation as Classification: Using Social and Content-Based Information in Recommendation," *Proceedings of the Annual 15th National Conference on Artificial Intelligence (AAAI-98), 10th Conference on Innovative Applications of Artificial Intelligence (IAAI98), Learning About People*, 1998, pp. 714-720.

Belkin, N.J. et al., "Information Filtering and Information Retrieval: Two Sides of the Same Coin?" *Communications of the ACM*, Dec. 1992, vol. 35, No. 12, pp. 29-38.

Berry, M.W. et al., "Using Linear Algebra for Intelligent Information Retrieval," Computer Science Dept., CS-94-270, Dec. 1994, 24 pages.

Boone, G., "Concept Features in Re: Agent, An Intelligent Email Agent," *Autonomous Agents*, 1998, pp. 141-148.

Breese, J.S. et al., "Empirical Analysis of Predictive Algorithms for Collaborative Filtering," Technical Report MSR-TR-98-12, Microsoft Research, Microsoft Corporation, pp. 1-20, May 1998, revised Oct. 1998.

Cohen, W.W., "Fast Effective Rule Induction," *12th Int. Conf. on Machine Learning*, Jul. 9-12, 1995, pp. 80-89.

Cohen, W.W., "Learning Rules that Classify E-Mail," in *Papers from the AAAI Spring Symposium on Machine Learning in Information Access*, pp. 18-25, Stanford, CA, 1996.

Decision Innovations, www.decision-innovations.com, Jan. 28, 1999 [retrieved Feb. 11, 2005], pp. 1-22, retrieved from: google.com and archive.org.

Ferber, F., "Imagine: Extracting knowledge from large collections" <http://teefix.femuni-hagen.de/~ferber/imagine/> (2 pages-dated May 7, 1998; printed Jan. 3, 2002).

Ferber, F., "Imagine: Interaction merger for associations gained by inspection of numerous exemplars" <http://teefix.femuni-hagen .de/~ferber/imagine/imagine-info-engl.html> (4 pages-dated Dec. 15, 1997; printed Jan. 3, 2002).

Goldberg, D. et al., "Using Collaborative Filtering to Weave an Information Tapestry," *Communications of the ACM*, Dec. 1992, vol. 35, No. 12, pp. 61-70.

Good, N. et al., "Combining Collaborative Filtering With Personal Agents for Better Recommendations," Dept. of Computer Science and Engineering, Univ. of Minnesota, *Proceedings of the AAAI-99*, 1999, 8 pages. Jul. 18-22, 1999.

Hao, M. et al. "Visualization of Directed Association in E-Commerce Transaction Data." downloaded from <http://www.hpl.hp.com/techreports/2000/HPL-2000-160.pdf (Hewlett-Packard Company, Dec. 5, 2000, 8 pages including cover page).

Herlocker, J.L. et al., "An Algorithmic Framework for Performing Collaborative Filtering." Dept. of Computer Science and Engineering, Univ. of Minnesota, *Proceedings of the 1999 Conference on Research & Development in Information Retrieval*, Aug. 1999, 8 pages.

Hill, W. et al., "Recommending and Evaluating Choices in a Virtual Community of Use," Computer Graphics and Interactive Media Group Home Page, printed Mar. 23, 2004, 12 pages.

Houstis, E.N. et al., "PYTHIA-II: A Knowledge/Database System for Managing Performance Data and Recommending Scientific Software," Dept. of Computer Sciences, Purdue Univ., 2000, 24 pages.

Johnson, M. et al. "Direct E-mail: Winning Long-term Consumer Attention." Jupiter Communications Analyst Report, Dec. 1998, pp. 1-26.

Joshi, A. et al., "Robust Fuzzy Clustering Methods to Support Web Mining," Dept. of Computer Engineering and Computer Science, Univ. of Missouri, 1998, 9 pages.

Karypis, G., "Evaluation of Item-Based Top-N Recommendation Algorithms," downloaded from <https://wwws.cs.umn. edu/tech_reports/listing/tr2000/00-046.pdf>., University of Minnesota—Computer Science and Engineering, Technical report #00-046, Sep. 15, 2000. 15 pages including cover page.

Karypis, G., "Suggest Top-N Recommendation Engine, Version 1.0," downloaded from http://www-users.cs.unm.edu/~karypis/suggest/Files/manual.pdf, Nov. 7, 2000, 11 pages.

Kautz, H. et al., "ReferralWeb: Combining Social Networks and Collaborative Filtering," *Communications of the ACM*, Mar. 1997, vol. 40, No. 3, 4 pages.

Konstan, J.A. et al., "Applying Collaborative Filtering to Usenet News," *Communications of the ACM*, Mar. 1997, vol. 40, No. 3, pp. 77-87.

Lieberman, H., "Autonomous Interface Agents," *Proceedings of the Conference on Human Factors in Computing Systems*, CHI '97, Mar. 1997, pp. 67-74.

Long, T. et al. "Beyond the Banner—the birth of email marketing," C.E. Unterberg, Towbin Report, pp. 1-72 (no date).

Maltz, D., Distributing Information for Collaborative Filtering on Usenet Net News, Master's Thesis, Massachusetts Institute of Technology, May 1994, 78 pages.

Maltz, D. et al., "Pointing the Way: Active Collaborative Filtering," *Proceedings of CHI '95*, Denver, Colorado, 1995, 8 pages.

McJones, P. and DeTreville, J., "Each to Each Programmer's Reference Manual," SRC Technical Note, 1997-023, Oct. 1, 1997, Systems Research Center, Palo Alto, CA, 16 pages.

Miller, B.N. et al., "Experiences with GroupLens: Making Usenet Useful Again," USENIX Association, 1997 Annual Technical Conference, pp. 219-233.

"Movie critic" Internet address: http://www.moviecritic.com/faq.html, May 8, 2000, 6 pages.

Nasraoui, O. et al, "Mining Web Access Logs Using Relational Competitive Fuzzy Clustering," Computer Engineering and Computer Science, Univ. of Missouri, 1999, 5 pages.

Net Perception, Inc., www.netperceptions.com, Jan. 18, 1997 [retrieved Feb. 11, 2005], pp. 1-31, retrieved from: google.com and archive.org.

"Net Perceptions Launches Comprehensive Hosted Marketing Service for eRetailers," Net Perceptions press release dated Jul. 12, 2000 <http:flbiz.yahoo.com/bw/000712/mn_netper.html> (3 pages-dated Jul. 12, 2000; printed Jul. 12, 2000).

O'Harrow Jr., R., "Private or Not?" Washington Post, May 17, 2000; G22 <http://www.washingtonpost.com/> (4 pages-dated May 17, 2000; printed Jun. 13, 2000).

ProQuest, "GroupLens focuses on customers," InfoWorld, San Mateo, Mar. 9, 1998, vol. 20, Issue 10, 3 pages.

ProQuest, "Net Perceptions Celebrates New Triumphs at Internet World Spring; GroupLens 3.0 Debuts, N2K's Music Boulevard Goes Live," Business Wire, New York, Mar. 5, 1998, 2 pages.

Resnick, P. et al., "GroupLens: An Open Architecture for Collaborative Filtering of Netnews," MIT Center for Coordination Science, Cambridge, MA, *Proceedings of the 1994 Computer Supported Collaborative Work Conference*, 1994, pp. 175-186.

Resnick, P. et al. "Recommender Systems," *Communications of the ACM*, vol. 40, No. 3, Mar. 1997, pp. 56-58.

Rocha, L.M., "Adaptive Recommendation and Open-Ended Semiosis," *Kybernetes*, 2001, vol. 30, No. 5-6, pp. 821-851.

Salton, G. and Buckley, C., "Term-Weighting Approaches in Automatic Text Retrieval," Dept. of Computer Science, Cornell University, Ithaca, NY, Information Processing & Management, 1988, vol. 24, No. 5, pp. 513-523.

Sarwar, B.M. et al., "Item-based Collaborative Filtering Recommendation Algorithms," Dept. of Computer Science and Engineering, Univ. of Minnesota, Minneapolis, MN,, Appears in WWW10, May 1-5, 2001, Hong Kong, 15 pages.

Sarwar et al., "Using Filtering Agents to Improve Prediction Quality in the GroupLens Research Collaborative Filtering System," Dept. of Computer Science and Engineering, Univ. of Minnesota, Minneapolis, MN, 1998, pp. 345-354. Nov. 14-18, 1998.

Schafer, J.B. et al. "Recommender Systems in E-Commerce," Proceedings of the ACM Conference on Electronic Commerce, Nov. 3-5, 1999, pp. 158-166.

Shardanand, U. and Maes, P. "Social Information Filtering: Algorithms for Automating 'Word of Mouth'," MIT Media-Lab, Cambridge, MA, *Proceedings of the ACM CHI '95*, 1995, pp. 210-217.

Stellin, S., "Internet Companies Learn How to Personalize Service," N.Y. Times, Aug. 28, 2000 <http://www.nytimes.com/library/tech/00/08/cyber/commerce/28commerce html> (5 pages-dated Aug. 28, 2000; printed Aug. 28, 2000).

Swets, J., "Measuring the Accuracy of Diagnostic Systems," *Science*, Jun. 1988, vol. 240, pp. 1285-1293.

Terveen, L. et al., "Phoaks: A System for Sharing Recommendations," *Communications of the ACM*, Mar. 1997, vol. 40, No. 3, pp. 59-62.

www.amazon.com—Shows user recommendations, as archived Nov. 9, 2000, 2 pages.

www.moviecritic.com—Internet website, as archived Feb. 18, 1999, 1 page.

\* cited by examiner

OPTIMIZED RULE BASED CONSTRAINTS FOR COLLABORATIVE FILTERING SYSTEMS

BACKGROUND OF THE INVENTION

A. Field of the Invention

This invention relates generally to data processing systems, and more particularly, collaborative filtering and recommender systems.

B. Description of the Related Art

Recommender systems are becoming widely used in e-commerce business activities. For example, systems that make personalized recommendations are used as a marketing tool to turn "window shoppers" into buyers, increase cross-sells and up-sells, and deepen customer loyalty. Recommender systems allow e-commerce operators to take advantage of customer databases to provide valuable personalized service to customers.

Current recommender systems can make generic recommendations to customers, but they do not take into account many of the business rules that merchandisers wish to implement, such as "don't recommend an item that is out of stock," "don't recommend an item from a category that the customer has not selected," "don't recommend items that are not in season," or "don't recommend inappropriate items to minors." In other words, current recommender systems base recommendations solely on the customer preference data.

Existing recommender systems allow only the simplest form of filtering, and they do it one of two ways, prefiltering or postfiltering.

Prefiltering requires a constraint system that discovers acceptable items and then submits all discovered items to a prediction system that makes recommendations from this subset. Prefiltering has some serious practical limitations, however. For example, gathering the list of acceptable items is difficult to accomplish efficiently as the list of acceptable items may be very large since it is selected from the whole item catalog.

Postfiltering also requires a system to filter the recommendation list. Postfiltering requires that the recommendation system produce more recommendations than actually required. The oversized list is passed to a constraint system, which then removes unacceptable items. Although postfiltering may avoid the problem of having to select items from a large list, it may fail to provide recommendations if the postfiltering eliminates all items.

SUMMARY OF THE INVENTION

Methods and systems consistent with the present invention provide a recommendation server that receives a recommendation request from a user of a client computer. The recommendation server contains software to provide recommendations to the user. To provide the recommendations, the recommendation server applies a constraint filter and a recommendation filter to a set of items.

In accordance with methods and systems consistent with the present invention, a method for providing a recommendation list specifies a constraint filter to select items satisfying a constraint, selects the items that satisfy the constraint filter, computes predicted values based on a recommendation filter, and appends the items meeting predetermined criteria.

In accordance with methods and systems consistent with the present invention, a method for applying a recommendation filter and a constraint filter to a plurality of items is provided. The method receives a recommendation request from a user, specifies a constraint filter to select ones of the items satisfying a constraint, and determines the order of the filters based on a cost of the filters. The method applies the constraint filter first when the cost of the constraint filter is lower than the cost of the recommendation filter. Otherwise, the method applies the recommendation filter first when the cost of the recommendation filter is lower than the cost of the constraint filter.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview

Recommender systems provide recommendations to users based on various attributes. For example, collaborative filtering (CF) systems are a specific type of recommender system that recommend items to a user based on the opinions of other users. In their purest form, CF systems do not consider the content of the items at all, relying exclusively on the judgement of humans of the item's value. In this way, CF systems attempt to recapture the cross-topic recommendations that are common in communities of people.

Commercial applications of ratings-based collaborative filtering now exist in a variety of domains including books, music, grocery products, dry goods and information. One example of using a CF system is the GroupLens Research system that provides a CF for Usenet news and movies. More information on CF technology may be found at <http://www.netperceptions.com>, hereby incorporated by reference.

To use the recommendation system, an operator may first create a constraint using a constraint language that allows different business rules to be described in textual form. For example, to select a candidate from a set of red items, a constraint may be: "candidate is a red-thing." To select a candidate from a set of movies that are both comedies and not r-rated, a constraint may be: "candidate is a comedy and not candidate is a r-rated."

An item may be anything for which a user may recommend. For example, in the domain of movies, each movie may be an item. An item may be assigned arbitrarily to one or more categories. For example, a fiction book may be a member of the "Fiction" category. Category membership may represent any attribute of a user or item. For example, an item that is in stock may be a member of the "in stock" category or an item that is red may be a member of the "red-things" category. This type of categorization allows the recommendation system to apply a constraint filter based on any attribute or combination of attributes of the item. A constraint filter is a software with a complex boolean expression as an attribute that the recommendation system uses to restrict items.

A constraint may also consist of free variables. A free variable is a placeholder for an attribute that can be determined at execution time. For example, to provide the user with the ability to choose a category when applying a constraint, a constraint may be: "candidate is a X," where the user inputs X at runtime.

Once the operator creates the constraint, the recommendation system may begin accepting recommendation requests from a user. To use the recommendation system, a user may access a web site with instructions and web pages for the user to fill out to use the recommendation system. Upon accessing the web site, the user enters a recommendation request including values for various free variables and the number of items desired. The recommendation request may include the values for the free variables for the constraint filter, the number of items desired and user information. One skilled in the art will appreciate that other methods may be used to obtain a recommendation request, such as a telephone call center or manual entry.

Once the recommendation system receives the recommendation request, the system next determines the order of a constraint filter and a recommendation filter to apply to the received recommendation request. The constraint filter determines whether an item satisfies a constraint and the recommendation filter determines a predicted value of the item based on historical or statistical information. One type of recommendation filter is the well-known collaborative filtering (CF) technique.

The recommendation filter may compute a predicted value to determine if an item should be recommended. A predicted value is a number that rates an item according to certain criteria. For example, a predicted value may be used to rank an item based on recommendations from similar users of the recommendation system. The predicted value is essentially an estimate of how much a user is likely to enjoy an item and may be determined, for example, by a CF technique. One skilled in the art will appreciate that the predicted value may be determined in a number of different ways, such as previous purchases, previous comments or a particular rating given by the user.

To determine the order of filters to apply, the recommendation system determines the cost of applying successively each filter to all items. The cost of applying each filter is explained below. For example, if the cost to apply a constraint filter before a recommendation filter is lower than the other sequence, the recommendation system may choose to apply the constraint filter first. Preferably, the recommendation system provides a recommendation to a user with the lowest cost.

Once the order of the filters is determined, the recommendation system recommends a list of items to the user that the user may be interested in based on the recommendation filter and also passes the constraint filter. If the cheapest method is to apply the constraint filter first, each time an item passes the constraint, it becomes a potential candidate for a recommendation list. The candidate is then passed to the recommendation filter. If the candidate passes the recommendation filter, the candidate and the candidate's predicted value are appended to a recommendation list.

System Components

Figure 1:
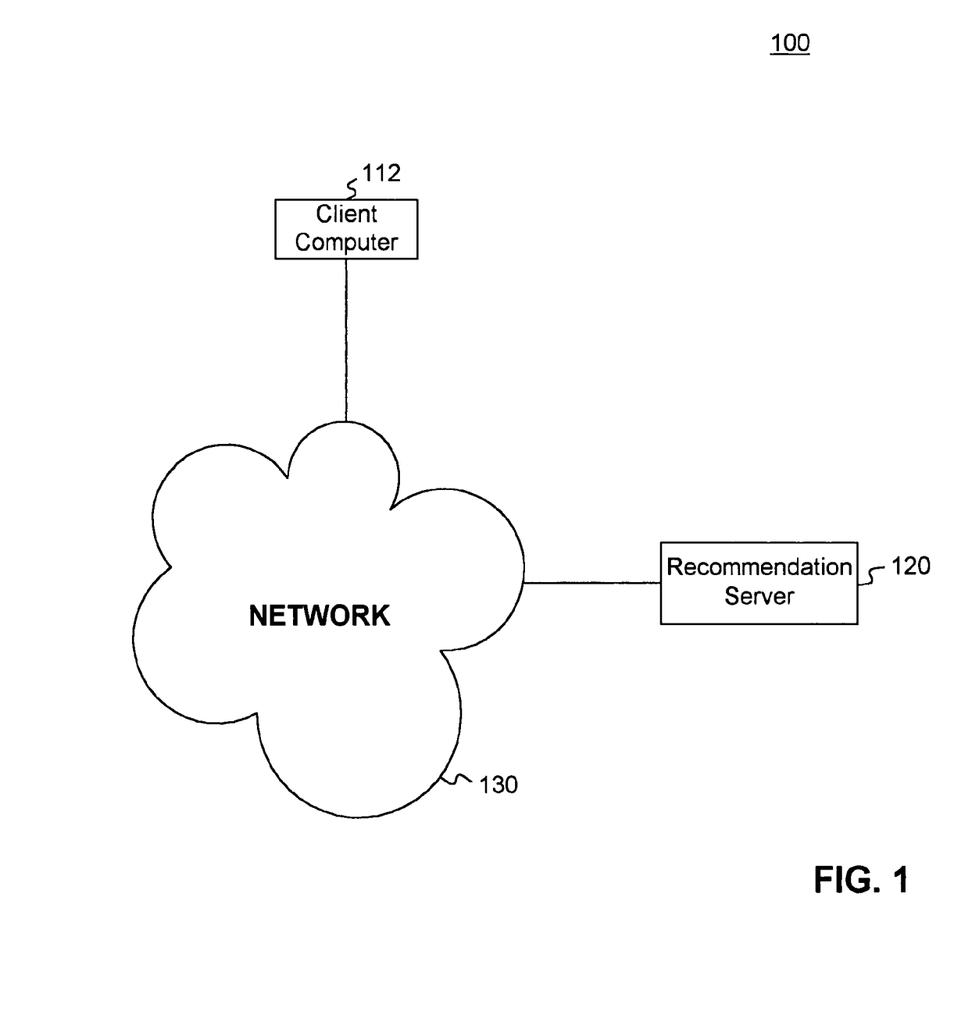
FIG. 1 depicts a data processing system suitable for practicing methods and systems consistent with the present invention.

FIG. 1 depicts a data processing system 100 suitable for practicing methods and systems consistent with the present invention. Data processing system 100 comprises a client computer 112 connected to recommendation server 120 via a network 130, such as the Internet. The user uses client computer 112 to provide various information to recommendation server 120.

Recommendation server 120 transmits and receives web pages from a browser on client computer 112 using hypertext markup language (HTML), Java or other techniques. These web pages may include images or instructions to obtain recommendation requests from a user. Recommendation server 120 also contains a database that stores various data, such as constraint filters, recommendation filters and items, further described below.

Although only one client computer 112 is depicted, one skilled in the art will appreciate that data processing system 100 may contain many more client computers and additional client sites. One skilled in the art will also appreciate that client computer 112 may come with the recommendation server software already installed.

Figure 2:
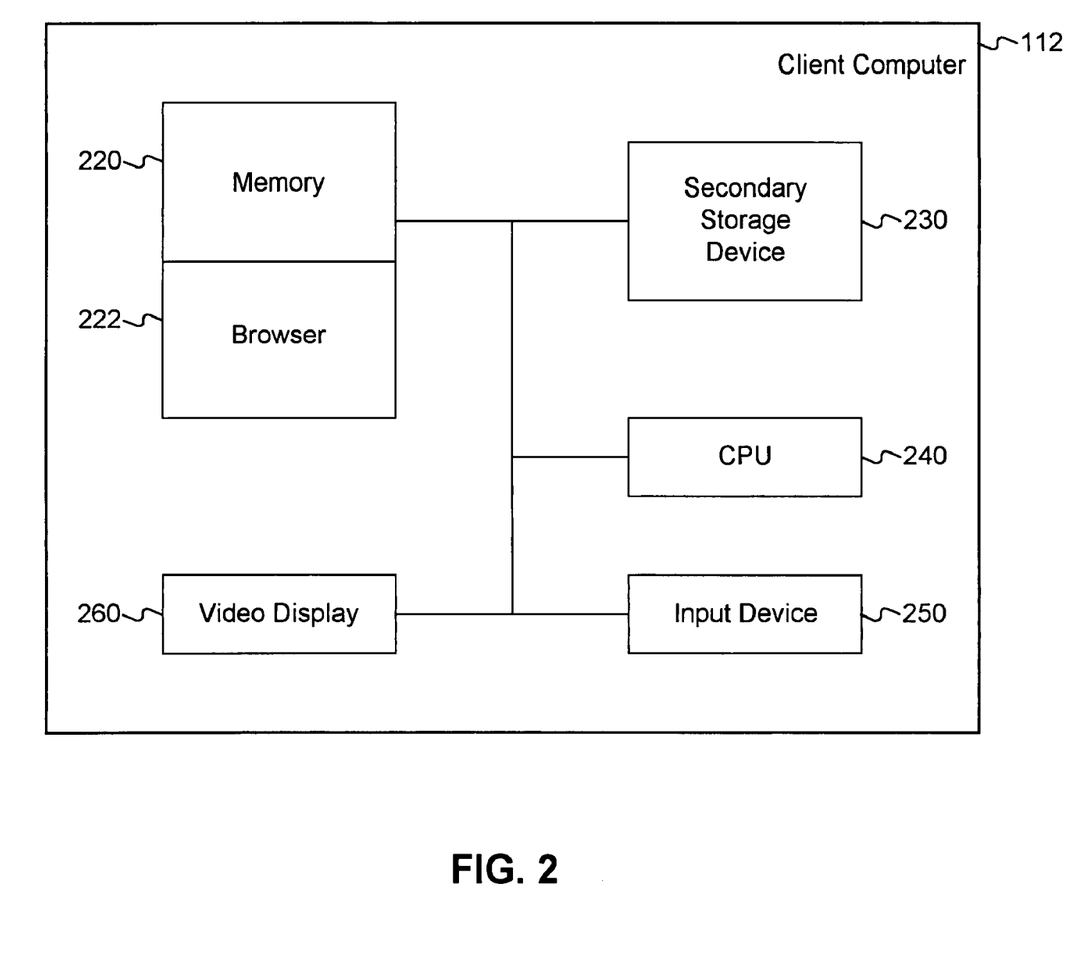
FIG. 2 depicts a more detailed diagram of the client computer depicted in FIG. 1.

FIG. 2 depicts a more detailed diagram of client computer 112, which contains a memory 220, a secondary storage device 230, a central processing unit (CPU) 240, an input device 250, and a video display 260. Memory 220 includes browser 222 that allows users to interact with recommendation server 120 by transmitting and receiving files. An example of a browser suitable for use with methods and systems consistent with the present invention is the Netscape Navigator browser, from Netscape.

Figure 3:
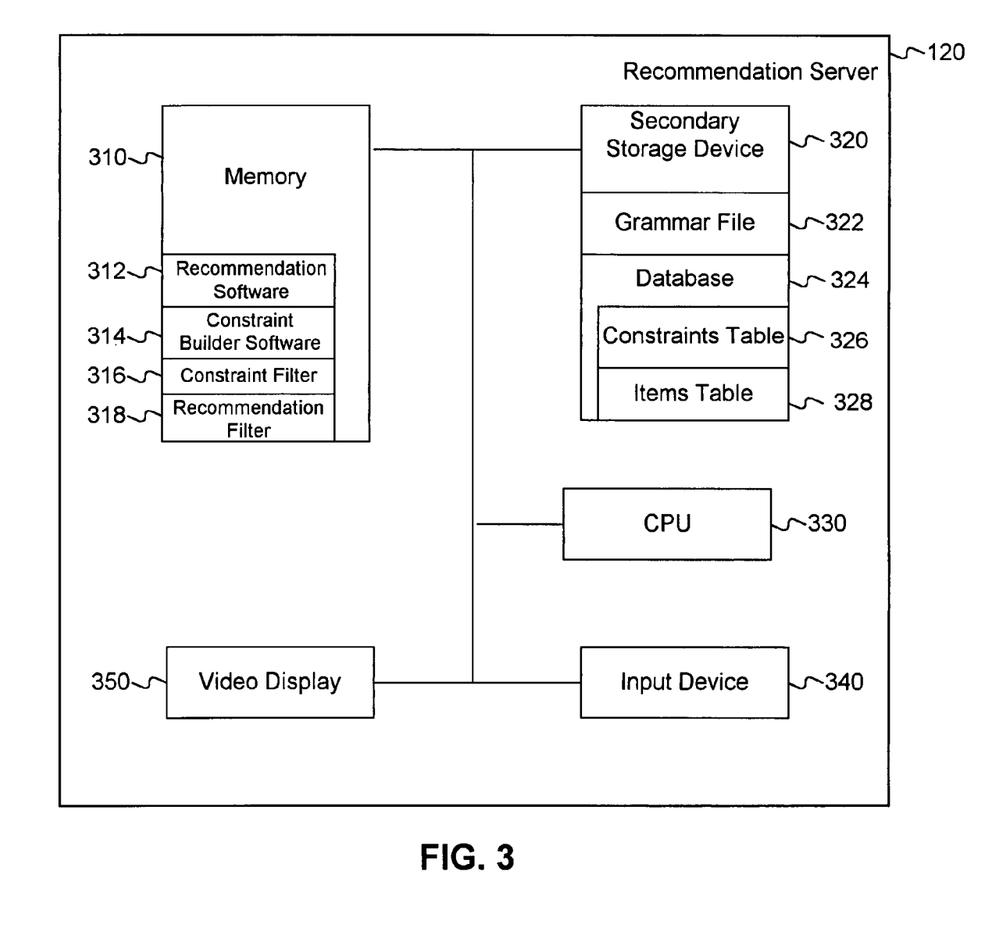
FIG. 3 depicts a more detailed diagram of the recommender server depicted in FIG. 1.

As shown in FIG. 3, recommendation server 120 includes a memory 310, a secondary storage device 320, a CPU 330, an input device 340, and a video display 350. Memory 310 includes recommendation software 312, which determines if an item should be recommended to the user by applying a constraint filter 316 and a recommendation filter 318, described below. Recommendation software 312 also interacts with client computer 112 for transmitting and receiving files, such as HTML files or Java files. To interact with client computer 112, recommendation software may include a web server. Although a web server is described in this particular embodiment of the recommendation server, recommendation server 120 may interact with a client in other ways such as, voice prompts, call centers, or kiosks. Memory 310 also includes constraint builder software 314, which creates constraints that are used by recommendation software 312 to recommend an item to the user. Recommendation software 312 and constraint builder software 314 also provide access to database 322 in secondary storage device 320.

Secondary storage device 320 includes grammar file 322 containing a set of rules which map textual constraints to their internal representation in the constraint filter. Secondary storage device also includes database 324 with constraint table 326 that stores built constraints to use with recommendation software 312 and item table 328 with attribute information about each item. For example, item table 328 could store a category identification, item number, and number in stock.

Although aspects of the present invention are described as being stored in memory, one skilled in the art will appreciate that these aspects may be stored on or read from other computer-readable media, such as secondary storage devices, like hard disks, floppy disks, and CD-ROM; a carrier wave received from a network like the Internet; or other forms of ROM or RAM. Additionally, although specific components and programs of client computer 112 and recommendation server 120 have been described, one skilled in the art will appreciate that these may contain additional or different components or programs.

Constraint Creation Process

Figure 4:
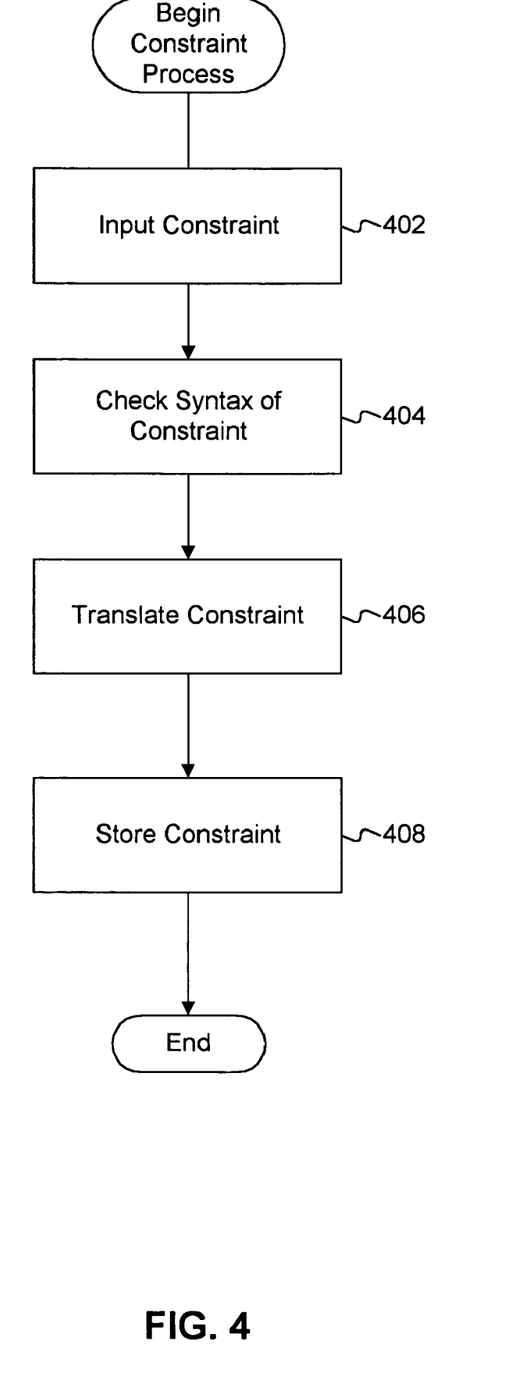
FIG. 4 depicts a flow chart of the steps performed by the data processing system of FIG. 1 when initiating the constraint process consistent with methods and systems of the present invention.

FIG. 4 depicts a flow chart of the steps performed when creating a constraint on recommendation server 120. The constraint creation process is initiated, for example, by an operator inputting a textual constraint into constraint builder software 314 (step 402). The constraint may contain free variables or bound expressions. After the operator inputs the constraint, the builder software checks the syntax of the constraint (step 404). For example, an acceptable syntax may include logical expressions or relational expression. That is, constraint builder software verifies that the operator created a valid constraint to signify a possible business rule. Logical expression include, for example, AND, OR, or NOT boolean expressions. Relational expressions include, for example EQUAL TO, GREATER THAN, LESS THAN or ISA.

Once the constraint is verified for the correct syntax, constraint builder software may translate the textual constraint into, for example, a constraint in a tree structure format (step 406). Constraint builder software 314 includes the well-known yacc parser to translate the textual constraint. The builder software reads grammar specification file 322 and generates a constraint tree consisting of objects by using the grammar specifications applied to the textual constraint. The new constraint tree is in a format acceptable to recommendation software 312.

Grammar specification file 322 consists of many different object formats to create the constraint tree, such as logical expression objects, relational expression objects or leaf objects. Logical expression objects are a type of boolean expression, such as AND, OR or NOT. Relational expression objects compare two leaf objects. Leaf objects represent any entity in the application domain. A leaf may be a category leaf, free variable leaf, candidate leaf, or subject leaf. A category leaf represents at least one item in database 324, such as "Thriller" or "Shoes." A free variable leaf is essentially a placeholder that is specified at execution time by the user or operator. The free variable leaf stores a variable name, which is bound to an actual entity in the application domain during the recommendation process, further described below. Similar to the free variable leaf, the candidate leaf is also a placeholder. The candidate leaf represents the actual item discovered by the recommendation filter. Finally, a subject leaf is a placeholder for the user who requested the recommendation. For example, a user may have an attribute of being 14 years old. Thus, leaf objects in the constraint tree may reflect this attribute.

For example, a textual constraint created by an operator to produce recommendations for movies that are now playing, and are of a genre selected by a user, and prohibits the recommendation of r-rated movies to minors may be:

X: (candidate is a movie) and (candidate is a X) and (candidate is a Now Play) and (not (subject is a minor) and (candidate is a R-rated)).

Figure 6A:
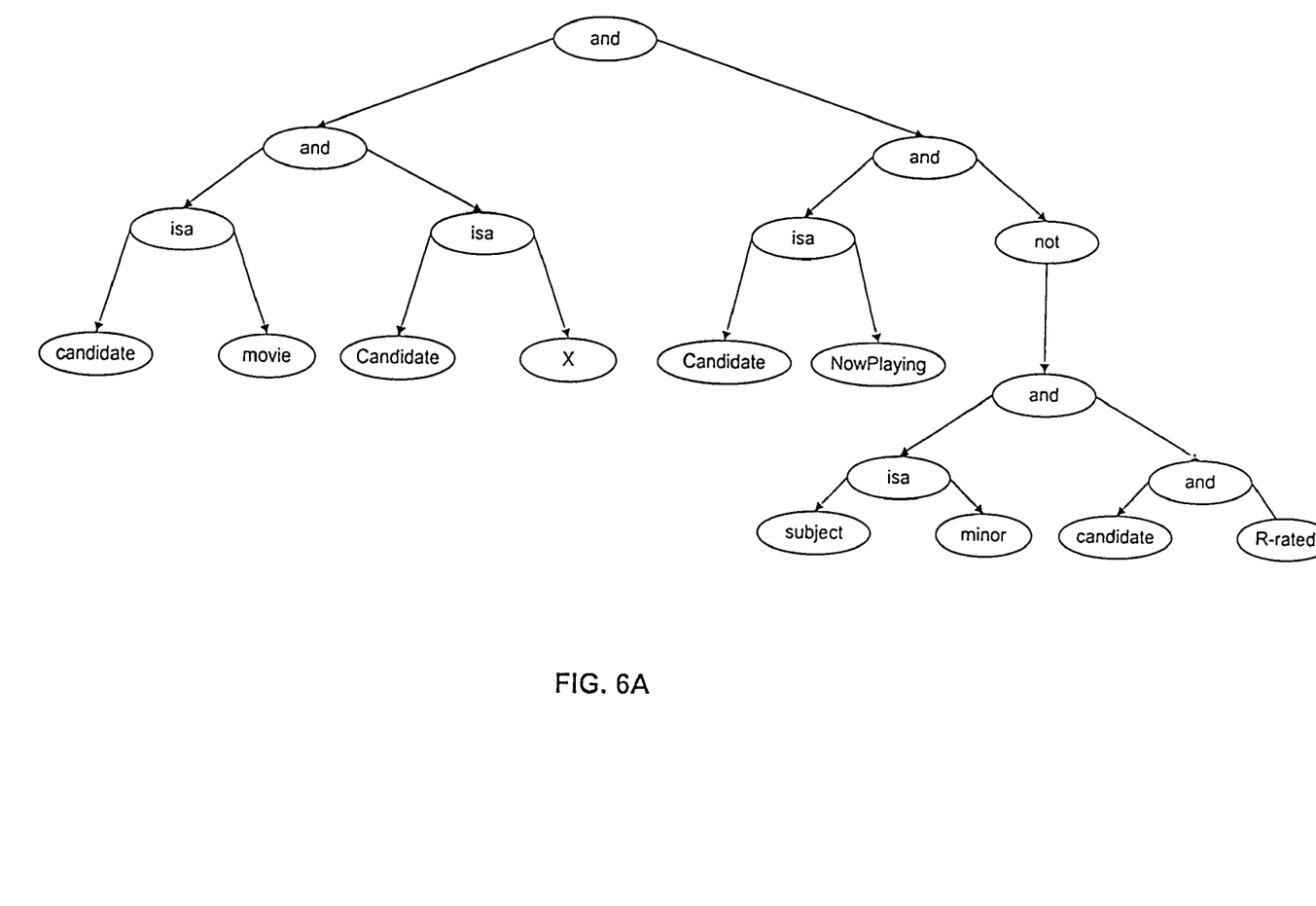
FIG. 6A depicts a constraint tree consistent with methods and systems of the present invention.

Constraint builder software 314 would translate the textual constraint to the tree of objects depicted in FIG. 6A.

Once constraint builder software 314 translates the textual constraint to a constraint tree, the constraint tree is placed as an entity in constraint table 326 (step 408). The constraint tree is used later by recommendation software 312 during the recommendation process. This completes the constraint creation process.

Recommendation Process

Figure 5:
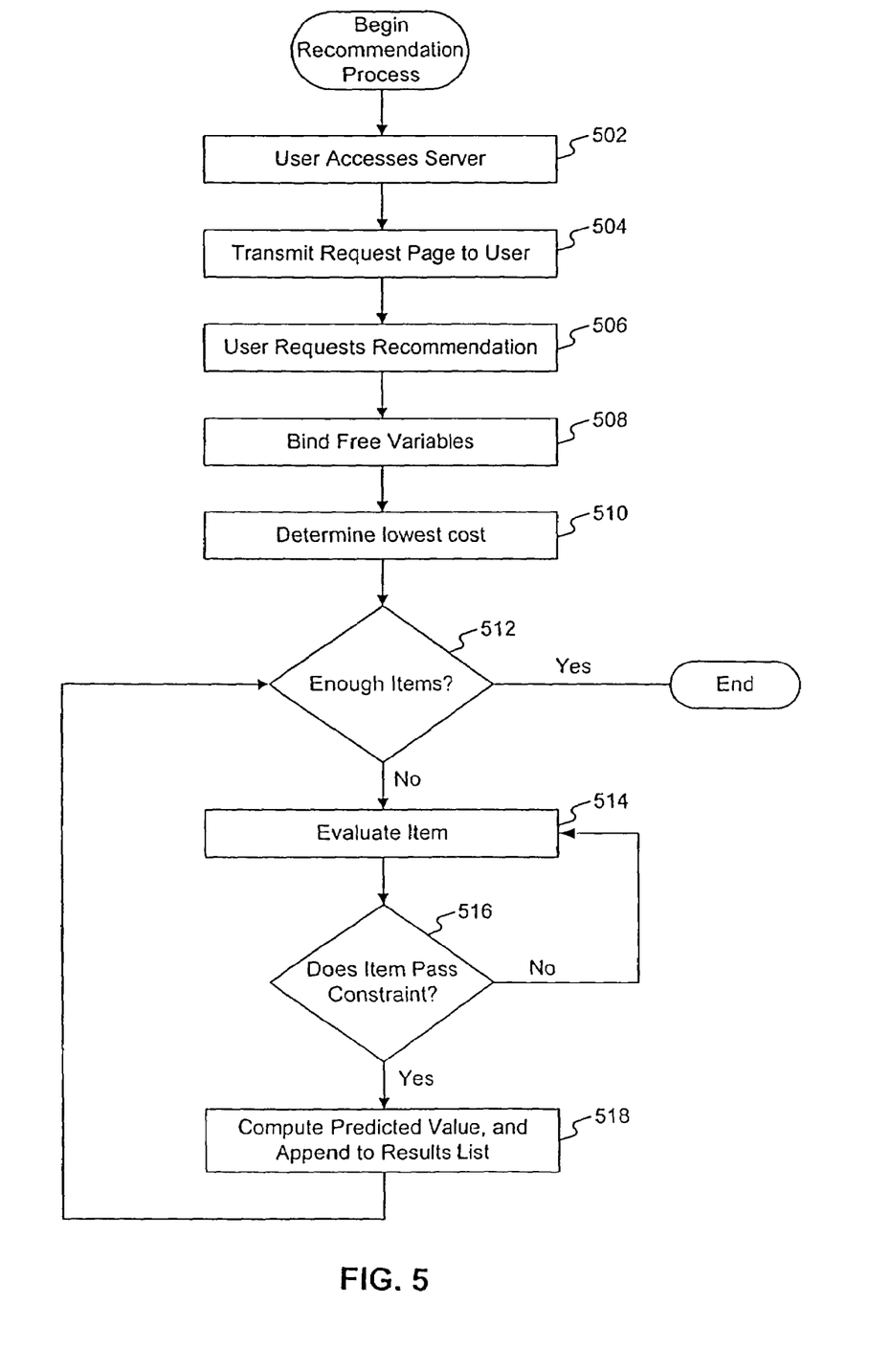
FIG. 5 depicts a flow chart of the steps performed by the data processing system of FIG. 1 when initiating the recommender process in accordance with methods and systems consistent with the present invention.
Figure 6B:
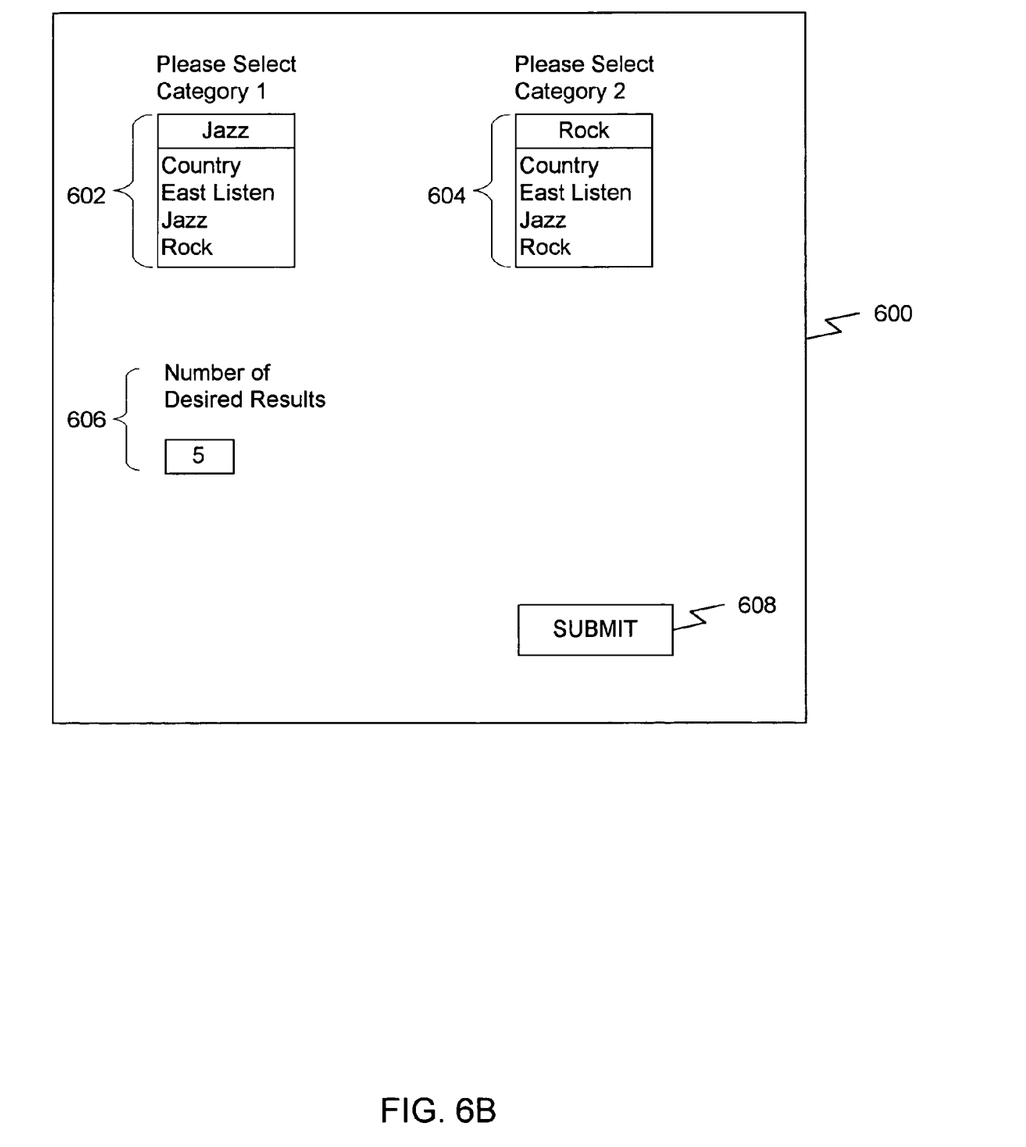
FIG. 6B depicts an recommendation request form interface consistent with methods and systems of the present invention.

FIG. 5 depicts a flow chart of the steps performed when initiating the recommendation process in accordance with methods and systems consistent with the present invention. The recommendation process is initiated, for example, by a user accessing recommendation server 120 (step 502). Once accessed, recommendation software 312 transmits a recommendation request page to client computer 112 (step 504). The request page may be in HTML. One skilled in the art will appreciate that the inquiry page may be designed in other formats, such as Visual Basic or Java. The request page may include a category selection fields 602 and 604, desired results field 606 for the user to fill out, and a submit button 608, as shown in FIG. 6B. Once the request page is displayed on browser 222, the user may select a category and enter the number of results and submit the request to recommendation server 120 by pressing button 608 (step 506). When button 608 is pressed, browser 222 transmits the category and number of results information to recommendation server 120 using the well-known HyperText Transport Protocol (HTTP).

Once received at recommendation server 120, recommendation software 312 binds the free variables in the appropriate constraint with the category selected by the user and the number of items desired (step 508). To do so, recommendation software 312 first locates the appropriate constraint in constraint table 326. The constraint may be found in constraint table 326, for example, by a tag appended to the recommendation request indicating the constraint. Once located, recommendation software 312 descends the constraint tree to locate free variable objects. Once a free variable object is found, recommendation software 312 copies the information from the recommendation request to the free variable. For example, in FIG. 6B, if a user selected "rock" and "jazz" as the categories to search, step 508 generates an array of length two that contains the object representing jazz and rock with a corresponding index number. The array looks as follows:

| Index | Object |
|---|---|
| 1 | Jazz |
| 2 | Rock |

Step 508 uses the array when descending the constraint tree searching for a free variable object. When a free variable object is located, the index is matched and the corresponding object is copied to the free variable object. Ultimately, recommendation software 312 will examine each node in the constraint tree to locate all free variables and store corresponding information in each free variable. Although two free variables were used in FIG. 6B, one skilled in the art will appreciate that many more free variables may exist in the recommendation request.

Figure 7:
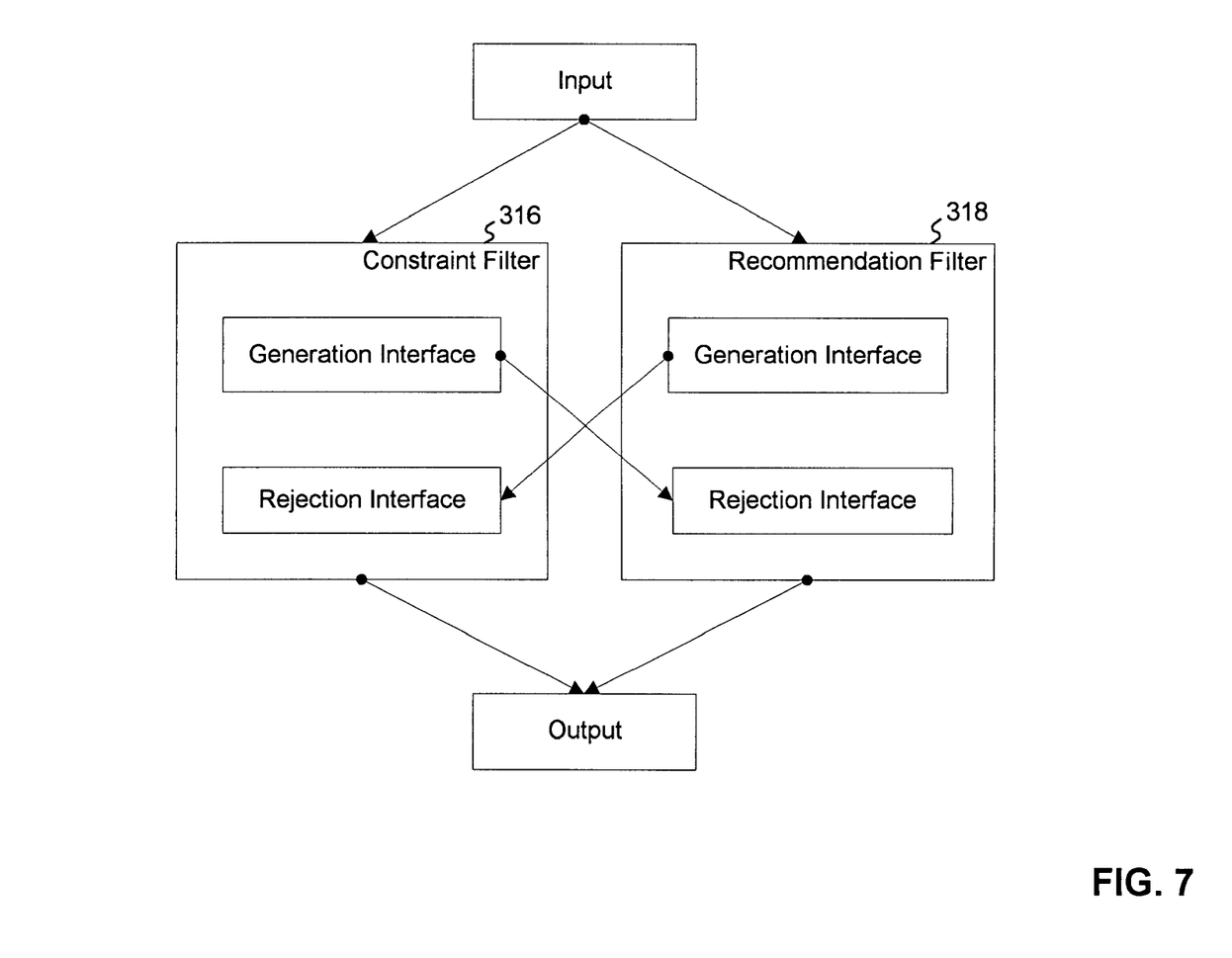
FIG. 7 depicts a constraint filter and recommendation filter consistent with methods and systems of the present invention.

After the free variables in the constraint tree are bound, recommendation software 312 examines each item in item table 328 for an item to recommend to the user. The process begins with recommendation software determining the lowest cost method to complete a recommendation request (step 510). To do so, recommendation software 312 determines the cost of applying constraint filter 316 and recommendation filter 318 in different orders to the items. As shown in FIG. 7, each filter has a generation interface that produces items and a rejection interface that determines whether a particular item is suitable for recommendation to the user. Each filter is applied sequentially. The generation interface is called on the first filter, and the produced items are passed to the rejection interface on the second filter.

If the cost of generating a sufficient number of items by applying the generation interface of the constraint filter before applying the rejection interface of the recommendation filter is lower than applying the generation interface of the recommendation filter before applying the rejection interface of the constraint filter, then recommendation software 312 will apply the generation interface of the constraint system first to item table 328. Otherwise, recommendation software 312 applies the generation interface of the recommendation filter first. The cost may be approximated by the following equation:

Cost=(number of results required/probability that a randomly selected item will pass the rejection interface of the second filter)*(cost of applying the generation interface of the first filter to generate a single item+cost of applying the rejection interface of the second filter to a single item)

Once the order of the filters is determined, recommendation software 312 determines if enough items have been located (step 512). That is, recommendation software continues to discover new items in item table 328 until the required number of items requested from the user has been reached. Once an item has been discovered in item table 328, the item is evaluated (step 514). Evaluation occurs by applying the constraint filter to the item. Items that pass the constraint filter will be passed to the recommendation filter (step 516). An item passes the constraint filter when it satisfies the constraints conditions. If an item does not pass the constraint filter, the item is discarded and not recommended.

Next, the recommendation filter may compute a predicted value for the item (step 518). Also in step 518, each item whose predicted value is at least a threshold value is appended to a result list for display on client computer 112. The results may be displayed in HTML.

Figure 6C:
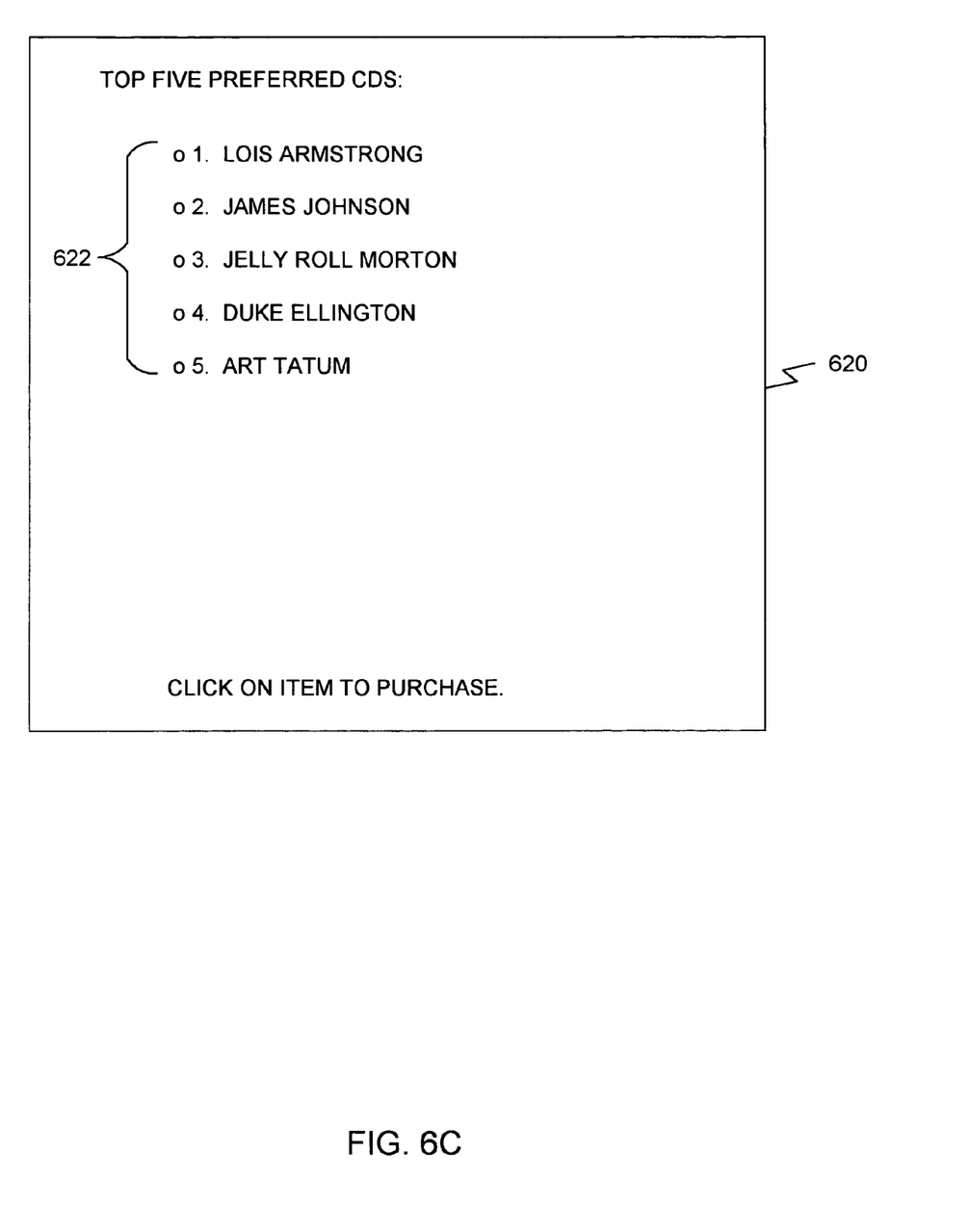
FIG. 6C depicts an output recommendation list interface consistent with methods and systems of the present invention.

FIG. 6C depicts an output interface 620 presented to the user after submitting the recommendation request in FIG. 6B. Output interface 620 contains a recommendation list 622. For example, the user may select an item from the list to purchase.

CONCLUSION

Methods, systems, and articles of manufacture consistent with the present invention provide a recommendation server that receives a recommendation request from a user of a client computer. The recommendation server contains software to provide recommendations to the user. To provide the recommendations, the recommendation server applies a constraint filter and a recommendation filter on a set of items.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone.

What is claimed is:

1. A computer-implemented method for providing a recommendation list from a plurality of items, comprising:
   receiving an adaptable constraint to apply during searches performed in response to recommendation requests, wherein the adaptable constraint includes a plurality of free variables;
   receiving a recommendation request including a plurality of values defined by a user, wherein the plurality of values includes at least one value for each of the plurality of free variables in the adaptable constraint;
   binding the received values to the corresponding free variables to update the adaptable constraint;
   searching the plurality of items in response to the received recommendation request, wherein a set of search parameters is defined by the updated adaptable constraint, and wherein the searching includes:
      determining an order for applying a recommendation filter and a constraint filter using a cost calculation based at least on (i) a number of results required, (ii) a probability that a randomly selected item of the plurality of items will pass the second applied filter of the recommendation filter and the constraint filter, (iii) a cost of applying the first applied filter of the recommendation filter and the constraint filter to generate a single item, and (iv) a cost of applying the second applied filter to the single item;
      selecting an item from the plurality of items and, in the determined order,
         applying the constraint filter, comprising determining if the item satisfies the updated adaptable constraint for the recommendation request, and
         applying the recommendation filter, comprising computing a predicted value based on the recommendation filter and determining if the predicted value exceeds a predetermined number,
      wherein if the item does not pass the first applied filter, the item is discarded; and
      appending the item to the recommendation list if the item passes both filters; and
   transmitting the recommendation list for presentation on a device.

2. The method of claim 1, wherein said selecting and appending are repeated until the recommendation list includes a predetermined number of items.

3. The method of claim 1, wherein applying the constraint filter further includes applying a constraint including a Boolean expression.

4. The method of claim 1, wherein applying the constraint filter further includes applying a constraint to including an equality expression.

5. The method of claim 1, wherein applying the constraint filter further includes applying a constraint to including a category membership expression.

6. The method of claim 1, wherein computing the predicted value further includes evaluating the item with collaborative filtering.

7. The method of claim 1, wherein receiving the adaptable constraint further includes:
   obtaining a constraint; and
   storing the constraint in memory.

8. The computer-implemented method of claim 1, wherein a free variable in the plurality of free variables for the adaptable constraint includes a set of possible values to be selected by the user.

9. The computer-implemented method of claim 1, further comprising:
building a constraint to apply to recommendation requests using constraint forming rules, wherein the constraint includes a plurality of free variables.

10. The computer-implemented method of claim 1, wherein the cost calculation is determined according to the equation:

cost=(number of results required/probability that a randomly selected item will pass the second applied filter)*(cost of applying the first filter to generate a single item+cost of applying the second filter to the single item).

11. The computer implemented method according to claim 1, wherein the cost calculation is based at least on a predetermined relationship among (i) a number of results required, (ii) a probability that a randomly selected item of the plurality of items will pass the second applied filter of the recommendation filter and the constraint filter, (iii) a cost of applying the first applied filter of the recommendation filter and the constraint filter to generate a single item, and (iv) a cost of applying the second applied filter to the single item.

12. An apparatus for providing a recommendation list from a plurality of items in a data processing system, comprising:
a processing component configured to process instructions for selecting items from the plurality of items, wherein the processing component includes:
a constraint filter including at least one constraint having a plurality of free variables, wherein a value for each free variable is defined by a user;
a recommendation filter; and
an order determination module configured to determine an order for applying the constraint filter and the recommendation filter using a cost calculation based at least on (i) a number of results required, (ii) a probability that a randomly selected item will pass the second applied filter of the constraint filter and the recommendation filter, (iii) a cost of applying the first applied filter of the recommendation filter and the constraint filter to generate a single item, and (iv) a cost of applying the second applied filter to the single item;
an input component configured to receive a recommendation request including a value defined by the user for each of the free variables in the constraint;
a recommender component configured to perform a search in response to a received recommendation request, wherein a set of search parameters is defined by the constraint, and to generate a recommendation list based on the constraint filter and the recommendation filter; and
an output component configured to transmit the generated list for presentation on a device.

13. The apparatus of claim 12, wherein the processing component further includes a prediction module configured to compute the predicted values based on the recommendation filter.

14. The apparatus of claim 12, wherein the order determination module is further configured to determine a lowest cost order.

15. The apparatus of claim 12, wherein the at least one constraint includes a Boolean expression.

16. The apparatus of claim 12, wherein the at least one constraint includes a category membership expression.

17. The apparatus of claim 12, wherein the at least one constraint includes an equality expression.

18. The apparatus of claim 12, wherein the recommendation filter includes a collaborative filtering module that computes predicted values by evaluating ones of the plurality of items.

19. The apparatus of claim 12, wherein the recommender component is further configured to search until the recommendation list includes a predetermined number of items.

20. The apparatus of claim 12, further comprising an input component configured to:
obtain a constraint; and
store the constraint in a memory.

21. The apparatus of claim 12, wherein the processing component is further configured to adaptively specify the constraint filter, using a set of constraint-forming rules.

22. The apparatus of claim 12, wherein the cost calculation is determined according to the equation:

cost=(number of results required/probability that a randomly selected item will pass the second applied filter)*(cost of applying the first filter to generate a single item+cost of applying the second filter to the single item).

23. The apparatus of claim 12, wherein the cost calculation is based at least on a predetermined relationship among (i) a number of results required, (ii) a probability that a randomly selected item of the plurality of items will pass the second applied filter of the recommendation filter and the constraint filter, (iii) a cost of applying the first applied filter of the recommendation filter and the constraint filter to generate a single item, and (iv) a cost of applying the second applied filter to the single item.

24. A computer-implemented method of generating recommendation lists from a plurality of items having assigned category memberships representing attributes of the items, comprising:
receiving a plurality of recommendation requests;
applying, during a search of the plurality of items performed for each recommendation request, a series of filters to each of the items, the series comprising a constraint filter and a recommendation filter for furnishing a predicted rating value, wherein the recommendation filter and the constraint filter are applied in an order determined using a cost calculation based at least on (i) a number of results required, (ii) the probability that a randomly selected item will pass the second applied filter of the recommendation filter and the constraint filter, (iii) a cost of applying the first applied filter of the recommendation filter and the constraint filter to generate a single item, and (iv) a cost of applying a second applied filter to the single item,
wherein the constraint filter is selected based on attributes associated with the recommendation request, wherein the constraint filter applies a constraint to the parameters of the search, the constraint having a plurality of free variables each free variable in the plurality of free variables has a value defined by the user;
generating, for each recommendation request, a recommendation list based on the predicted rating value for the item that passes the constraint filter and the recommendation filter; and
for each recommendation request, transmitting the generated list to a user for presentation on a device.

25. The method of claim 24, further comprising:
building a constraint using constraint forming rules; and
incorporating the constraint into the constraint filter.

26. The method of claim 24 wherein the recommendation filter and the constraint filter are applied in a lowest cost order.

27. The method of claim 24, wherein generating the recommendation list comprises generating a list of recommendations based on predicted rating values of the items that pass the constraint filter and the recommendation filter being in excess of a specified rating value.

28. The method of claim 24, wherein generating the recommendation list comprises generating a list of recommendations based on a specified number of the items that pass the constraint filter and the recommendation filter with highest predicted rating values.

29. The computer-implemented method of claim 24, wherein the cost calculation is determined according to the equation:

$$\text{cost}=(\text{number of results required}/\text{probability that a randomly selected item will pass the second applied filter})*(\text{cost of applying the first filter to generate a single item}+\text{cost of applying the second filter to the single item}).$$

30. The computer implemented method according to claim 24, wherein the cost calculation is based at least on a predetermined relationship among (i) a number of results required, (ii) a probability that a randomly selected item of the plurality of items will pass the second applied filter of the recommendation filter and the constraint filter, (iii) a cost of applying the first applied filter of the recommendation filter and the constraint filter to generate a single item, and (iv) a cost of applying the second applied filter to the single item.

31. A method of generating a recommendation list from plurality of items having assigned category memberships representing attributes of the items, comprising:
building a constraint using constraint forming rules, wherein the constraint includes a plurality of free variables;
receiving a recommendation request including a plurality of values defined by a user, wherein the plurality of values includes at least one value for each of the plurality of free variables in the constraint;
binding the received values to the corresponding free variables to update the constraint;
incorporating the constraint into a constraint filter;
determining a cost for a first order based at least on (i) a number of results required, (ii) a probability that a randomly selected item will pass the recommendation filter, (iii) a cost of applying the constraint filter to generate a single item, and (iv) a cost of applying the recommendation filter to the single item the first order being applying the constraint filter before applying the recommendation filter;
determining a cost for a second order based at least on (i) a number of results required, (ii) a probability that a randomly selected item will pass the constraint filter, (iii) a cost of applying the recommendation filter to generate a single item, and (iv) a cost of applying the constraint filter to the single item, the second order being applying the recommendation filter before applying the constraint filter;
establishing one of the first and second orders as the lowest cost order based on the respective costs thereof;
applying a series of filters to each of the plurality of items during a search performed in response to the recommendation request, the series comprising the recommendation filter and the updated constraint filter in the lowest cost order, wherein a set of parameters for the search is defined by the constraint;
generating a list of recommendations based on the predicted rating values for the items that pass the constraint filter and the recommendation filter; and
transmitting the generated list to the user for presentation on a device.

32. The method of claim 31, wherein a free variable in the plurality of free variables for the adaptable constraint includes a set of possible values to be selected by the user.

33. The method of claim 31, wherein the cost calculation is determined according to the equation:

$$\text{cost}=(\text{number of results required}/\text{probability that a randomly selected item will pass the second applied filter})*(\text{cost of applying the first filter to generate a single item}+\text{cost of applying the second filter to the single item}).$$

34. The method according to claim 31, wherein the cost for the first order is based at least on a predetermined relationship among (i) a number of results required, (ii) a probability that a randomly selected item of the plurality of items will pass the recommendation filter, (iii) a cost of applying the constraint filter to generate a single item, and (iv) a cost of applying the recommendation filter to the single item, and
wherein the cost for the second order is based at least on a predetermined relationship among (i) a number of results required, (ii) a probability that a randomly selected item of the plurality of items will pass the constraint filter, (iii) a cost of applying the recommendation filter to generate a single item, and (iv) a cost of applying the constraint filter to the single item.

35. A computer program product comprising a computer readable storage medium including control logic stored therein, the control logic enabling the generation of a recommendation list, by a method comprising:
receiving an adaptable constraint to apply during searches performed in response to recommendation requests, wherein the adaptable constraint includes a plurality of free variables;
receiving a recommendation request including a plurality of values defined by a user, wherein the plurality of values includes at least one value for each of the plurality of free variables in the adaptable constraint;
binding the received values to the corresponding free variables to update the adaptable constraint; and
searching a plurality of items in response to the received recommendation request, wherein a set of search parameters is defined by the updated adaptable constraint, comprising:
determining an order of applying a recommendation filter and a constraint filter using a cost calculation based at least on (i) a number of results required, (ii) a probability that a randomly selected item will pass a second applied filter of the recommendation filter and the constraint filter, (iii) a cost of applying the first applied filter of the recommendation filter and the constraint filter to generate a single item, and (iv) a cost of applying the second applied filter to the single item;
selecting an item from the plurality of items,
applying a first filter of the recommendation filter and the constraint filter according to the determined order,
if the item does not pass the first applied filter, discarding the item, if the item passes the first applied filter, applying the second filter of the recommendation filter and the constraint filter according to the determined order, and if the item passes both the first and second filters, appending the item to the recommendation list.

36. The computer program product of claim 35, wherein the cost calculation is determined according to the equation:

cost=(number of results required/probability that a randomly selected item will pass the second applied filter)*(cost of applying the first filter to generate a single item+cost of applying the second filter to the single item).

37. The computer program product of claim 35, wherein the cost calculation is based at least on a predetermined relationship among (i) a number of results required, (ii) a probability that a randomly selected item of the plurality of items will pass the second applied filter of the recommendation filter and the constraint filter, (iii) a cost of applying the first applied filter of the recommendation filter and the constraint filter to generate a single item, and (iv) a cost of applying the second applied filter to the single item.

38. A method for providing a recommendation list, comprising:

receiving a recommendation request including a value corresponding to a free variable of a constraint; and generating a recommendation list of at least one item of a plurality of items in response to the recommendation request, comprising:

determining an order for applying a constraint filter, including the constraint, and a recommendation filter, based at least on (i) a number of results required, (ii) a probability that a randomly selected item of the plurality of items will pass a second applied filter of the recommendation filter and the constraint filter, (iii) a cost of applying the first applied filter of the recommendation filter and the constraint filter to generate a single item, and (iv) a cost of applying the second applied filter to the single item;

selecting an item from the plurality of items;

applying a first filter of the recommendation filter and the constraint filter according to the determined order;

applying a second filter of the recommendation filter and the constraint filter according to the determined order if the item passes the first filter; and appending the item to the recommendation list if the item passes both the first filter and the second filter.

39. The method according to claim 38, wherein the cost calculation is based at least on a predetermined relationship among (i) a number of results required, (ii) a probability that a randomly selected item of the plurality of items will pass the second applied filter of the recommendation filter and the constraint filter, (iii) a cost of applying the first applied filter of the recommendation filter and the constraint filter to generate a single item, and (iv) a cost of applying the second applied filter to the single item.

* * * * *

UNITED STATES PATENT AND TRADEMARK OFFICE
CERTIFICATE OF CORRECTION

| | | |
|---|---|---|
| PATENT NO. | : 7,461,058 B1 | Page 1 of 1 |
| APPLICATION NO. | : 09/404597 | |
| DATED | : December 2, 2008 | |
| INVENTOR(S) | : Rauser et al. | |

It is certified that error appears in the above-identified patent and that said Letters Patent is hereby corrected as shown below:

Page 2, Other Publications
Item (56), "Jarke, M. and J. Koch "Query Optimization in Database Systems", ACM Computing Surveys, vol. 16, No. 2, pp. 111-152, Jun. 1984." is listed twice; duplicate entry should be deleted.

Column 3
Line 9, "is a" should read --isa--.

Line 11, "is a" should read --isa--.

Line 12, "is a" should read --isa--.

Line 30, "is a" should read --isa--.

Column 6
Line 3, "is a movie" should read --isa movie--.

Line 3, "is a X" should read --isa X--.

Line 4, "is a Now Play" should read --isa NowPlay--.

Column 8
Line 56, "constraint to including" should read --constraint including--.

Line 59, "constraint to including" should read --constraint including--.

Column 11
Line 52, "item the first" should read --item, the first--.

Signed and Sealed this

Fifth Day of January, 2010

David J. Kappos
*Director of the United States Patent and Trademark Office*